United States Patent
Hao et al.

(10) Patent No.: US 12,519,522 B2
(45) Date of Patent: Jan. 6, 2026

(54) CSI REFERENCE RESOURCE FOR TDM BASED MULTIPLE TRANSMISSION RECEPTION TRANSMISSIONS

(71) Applicant: QUALCOMM Incorporated, San Diego, CA (US)

(72) Inventors: Chenxi Hao, Beijing (CN); Chao Wei, Beijing (CN); Yu Zhang, San Diego, CA (US); Liangming Wu, Beijing (CN); Qiaoyu Li, Beijing (CN); Hao Xu, Beijing (CN); Mostafa Khoshnevisan, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 350 days.

(21) Appl. No.: 17/904,179

(22) PCT Filed: Feb. 14, 2020

(86) PCT No.: PCT/CN2020/075312
§ 371 (c)(1),
(2) Date: Aug. 12, 2022

(87) PCT Pub. No.: WO2021/159480
PCT Pub. Date: Aug. 19, 2021

(65) Prior Publication Data
US 2023/0113651 A1    Apr. 13, 2023

(51) Int. Cl.
*H04B 7/06* (2006.01)
(52) U.S. Cl.
CPC ......... *H04B 7/0626* (2013.01); *H04B 7/0632* (2013.01); *H04B 7/0639* (2013.01)

(58) Field of Classification Search
CPC .. H04B 7/0626; H04B 7/0632; H04B 7/0639; H04L 5/0053; H04L 5/0057; H04L 5/0023; H04L 5/0035; H04L 5/005; H04L 5/1469; H04L 5/0094
See application file for complete search history.

(56) References Cited

U.S. PATENT DOCUMENTS

| 2018/0097600 A1 | 4/2018 | Bagheri et al. |
| 2018/0220397 A1 | 8/2018 | Paredes Cabrera et al. |
| 2018/0220398 A1 | 8/2018 | John Wilson et al. |

(Continued)

FOREIGN PATENT DOCUMENTS

| CN | 109565397 A | 4/2019 |
| CN | 110679111 A | 1/2020 |

(Continued)

OTHER PUBLICATIONS

Ericsson: "On CSI Reporting for sTTI", 3GPP TSG-RAN WG1 Meeting #91 R1-1720530, Reno, Nevada, USA, Nov. 27-Dec. 1, 2017, Dec. 1, 2017 (Dec. 1, 2017), pp. 1-9, Section 1-2.

(Continued)

*Primary Examiner* — Kiet Tang
(74) *Attorney, Agent, or Firm* — Patterson+ Sheridan, L.L.P.

(57) ABSTRACT

Aspects of the present disclosure relate to wireless communications, and more particularly, to techniques for calculating and reporting channel state information (CSI) for time division multiplexed (TDM) based multiple transmission reception point (mTRP) transmissions.

26 Claims, 9 Drawing Sheets

(56) References Cited

U.S. PATENT DOCUMENTS

| | | | |
|---|---|---|---|
| 2018/0227945 A1* | 8/2018 | Akkarakaran | H04L 5/0051 |
| 2019/0068303 A1 | 2/2019 | Gao et al. | |
| 2019/0230687 A1* | 7/2019 | Parkvall | H04W 72/0446 |
| 2019/0356457 A1 | 11/2019 | Lee et al. | |
| 2020/0127786 A1* | 4/2020 | Kwak | H04B 7/0417 |
| 2021/0235453 A1 | 7/2021 | Matsumura et al. | |
| 2022/0124753 A1* | 4/2022 | Shen | H04W 72/20 |
| 2022/0232614 A1* | 7/2022 | Gao | H04W 72/23 |
| 2023/0093335 A1* | 3/2023 | Harrison | H04B 7/0617 370/329 |

FOREIGN PATENT DOCUMENTS

| | | |
|---|---|---|
| CN | 110710252 A | 1/2020 |
| CN | 112335283 A | 2/2021 |
| EP | 3381136 A1 | 10/2018 |
| EP | 3657705 A1 | 5/2020 |
| WO | 2019017679 A1 | 1/2019 |
| WO | 2019215888 A1 | 11/2019 |

OTHER PUBLICATIONS

Huawei, et al, "Discussion on CSI feedback for short TTI", 3GPP TSG RAN WG1 Meeting #88bis, R1-1704259, Spokane, USA, Apr. 3-7, 2017, Apr. 7, 2017 (Apr. 7, 2017), 3 Pages, the whole document.

Huawei, et al, "Discussion on sTTI UE Demodulation Performance Requirements", 3GPP TSG-RAN WG4 Meeting #86, R4-1801683, Athens, Greece, Feb. 26-Mar. 2, 2018, Mar. 2, 2018 (Mar. 2, 2018), 5 pages, the whole document.

International Search Report and Written Opinion—PCT/CN2020/075312—ISA/EPO—Nov. 18, 2020.

Supplementary European Search Report—EP20919061—Search Authority—The Hague—Oct. 11, 2023.

* cited by examiner

CSI REFERENCE RESOURCE FOR TDM BASED MULTIPLE TRANSMISSION RECEPTION TRANSMISSIONS

CROSS-REFERENCE TO RELATED APPLICATIONS

This application is a national stage application under 35 U.S.C. 371 of PCT/CN2020/075312, filed Feb. 14, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques for calculating and reporting channel state information (CSI) for time division multiplexed (TDM) based multiple transmission reception point (mTRP) transmissions.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access, Certain aspects provide a method for wireless communication by a user equipment (UE). The method generally includes receiving a channel state information (CSI) report configuration or a CSI request indicating one or more sets of CSI reference signal (CSI-RS) ports, determining a CSI reference resource, wherein the CSI reference resource comprises one or more transmission time intervals (TTIs), wherein each TTI comprises a mini-slot within a slot, calculating CSI using the determined CSI reference resource, and reporting the CSI.

Certain aspects provide a method for wireless communication by a network entity. The method generally includes transmitting, to a user equipment (UE), a channel state information (CSI) report configuration or a CSI request indicating one or more sets of CSI reference signal (CSI-RS) ports, determining a CSI reference resource, wherein the CSI reference resource comprises one or more transmission time intervals (TTIs), wherein each TTI comprises a mini-slot within a slot, and receiving, from the UE, CSI calculated using the CSI reference resource.

Certain aspects provide means for, apparatus, and/or computer readable medium having computer executable code stored thereon, for techniques described herein for processing multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
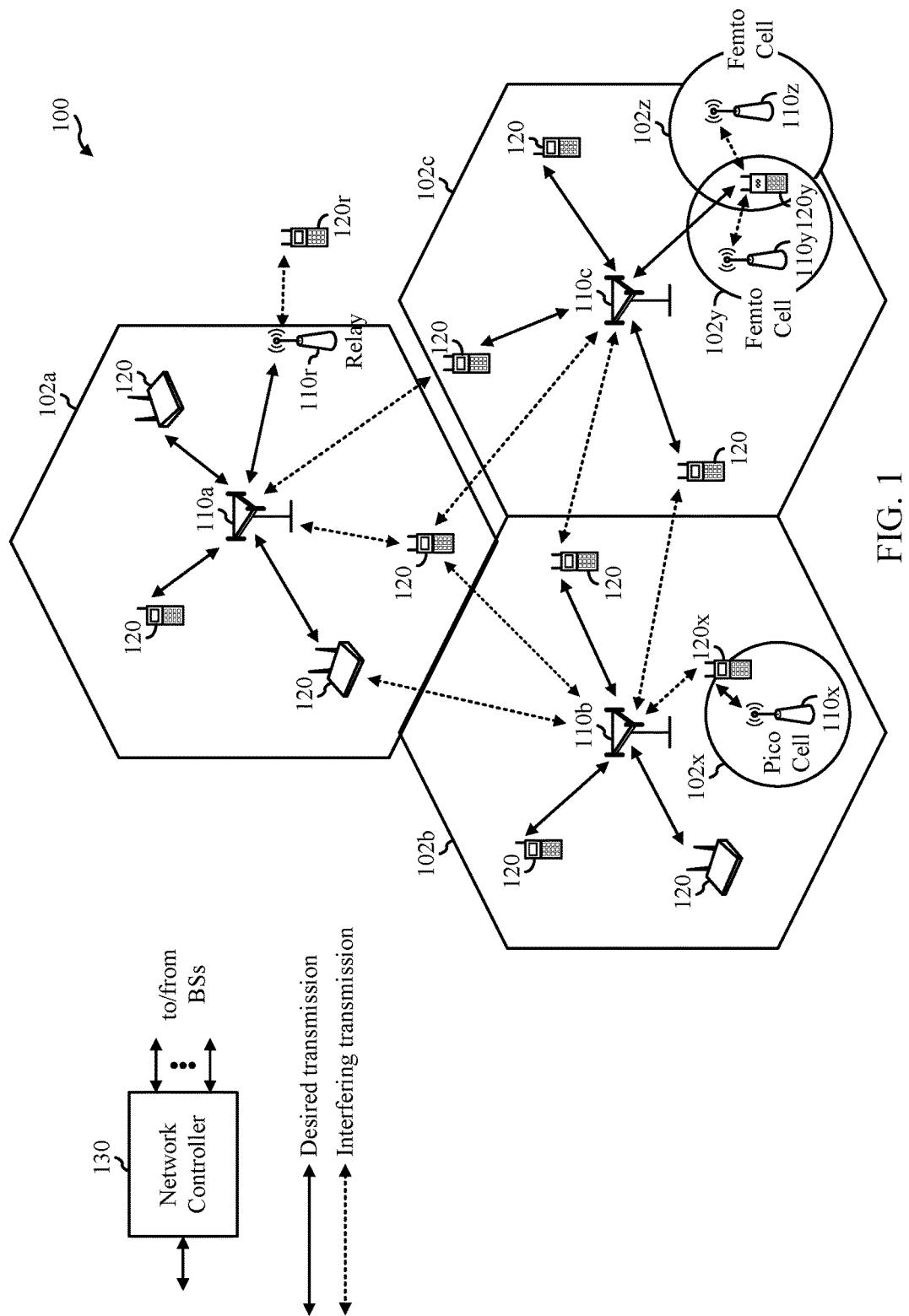
FIG. 1 is a block diagram conceptually illustrating an example telecommunications system, in accordance with certain aspects of the present disclosure.

Aspects of the present disclosure provide apparatus, methods, processing systems, and computer readable mediums for calculating and reporting channel state information (CSI) for time division multiplexed (TDM) based multiple transmission reception point (mTRP) transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to perform operations 700 of FIG. 7 to calculate CSI, while BSs 110 may perform operations 800 of FIG. 8 to process the CSI.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
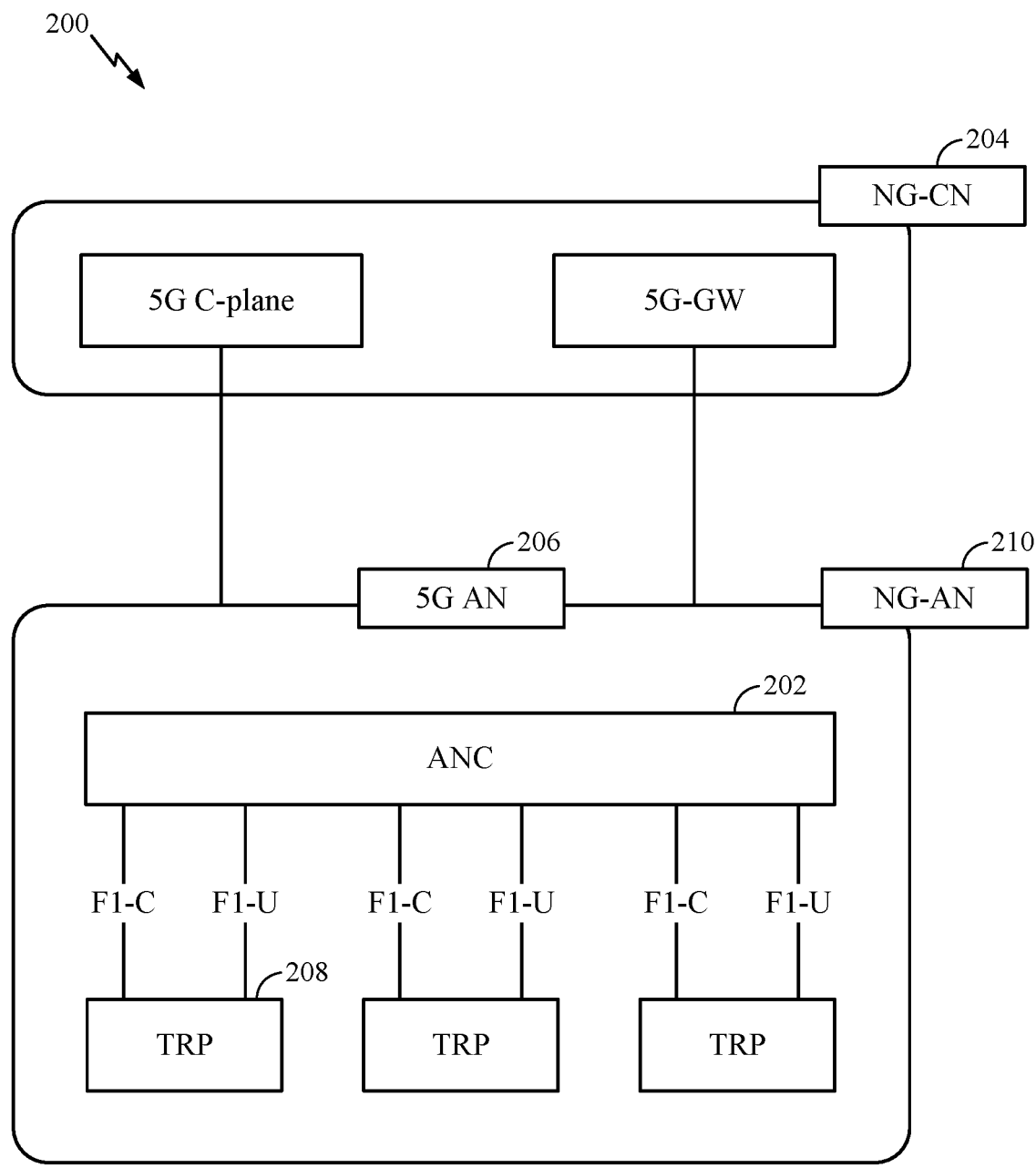
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
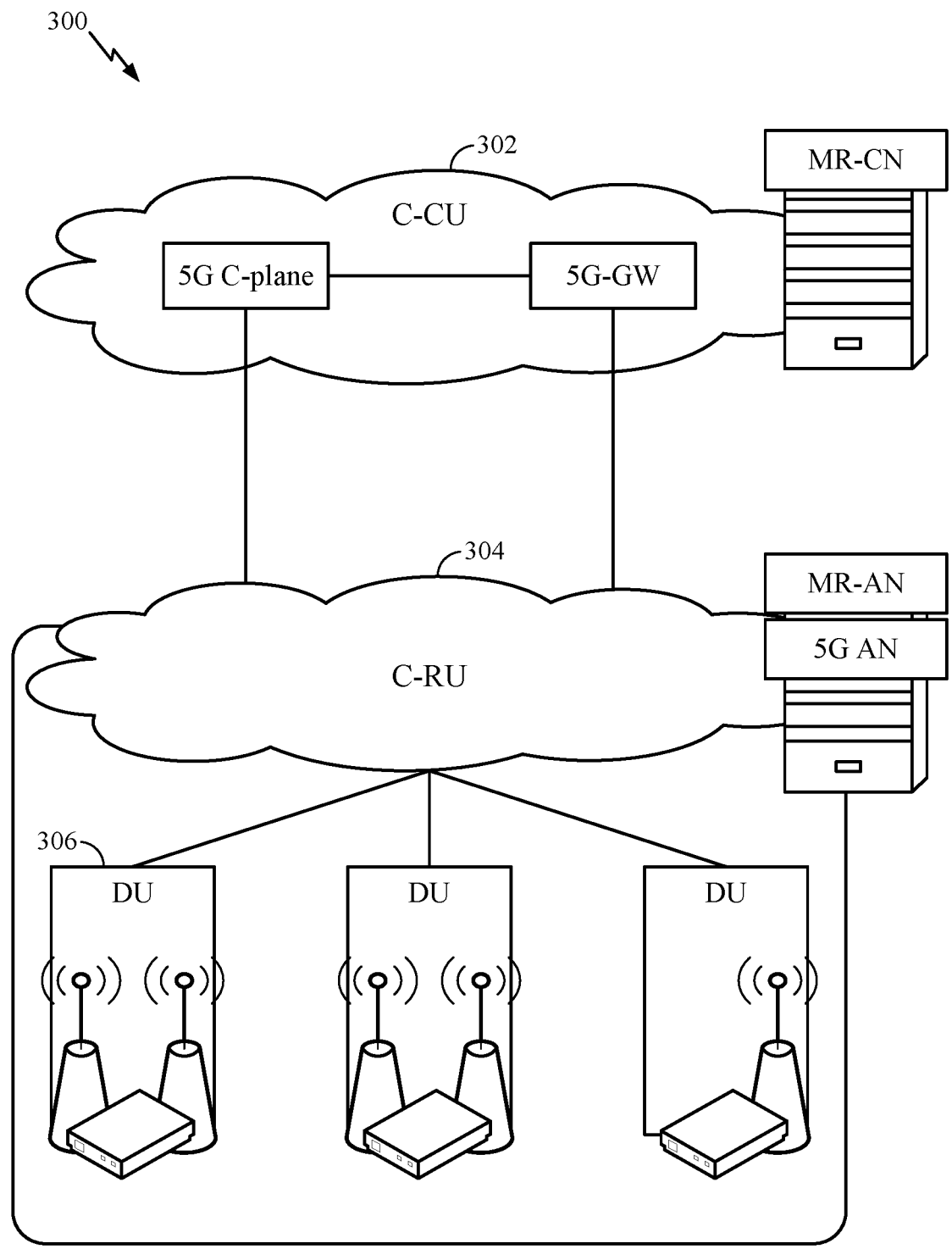
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
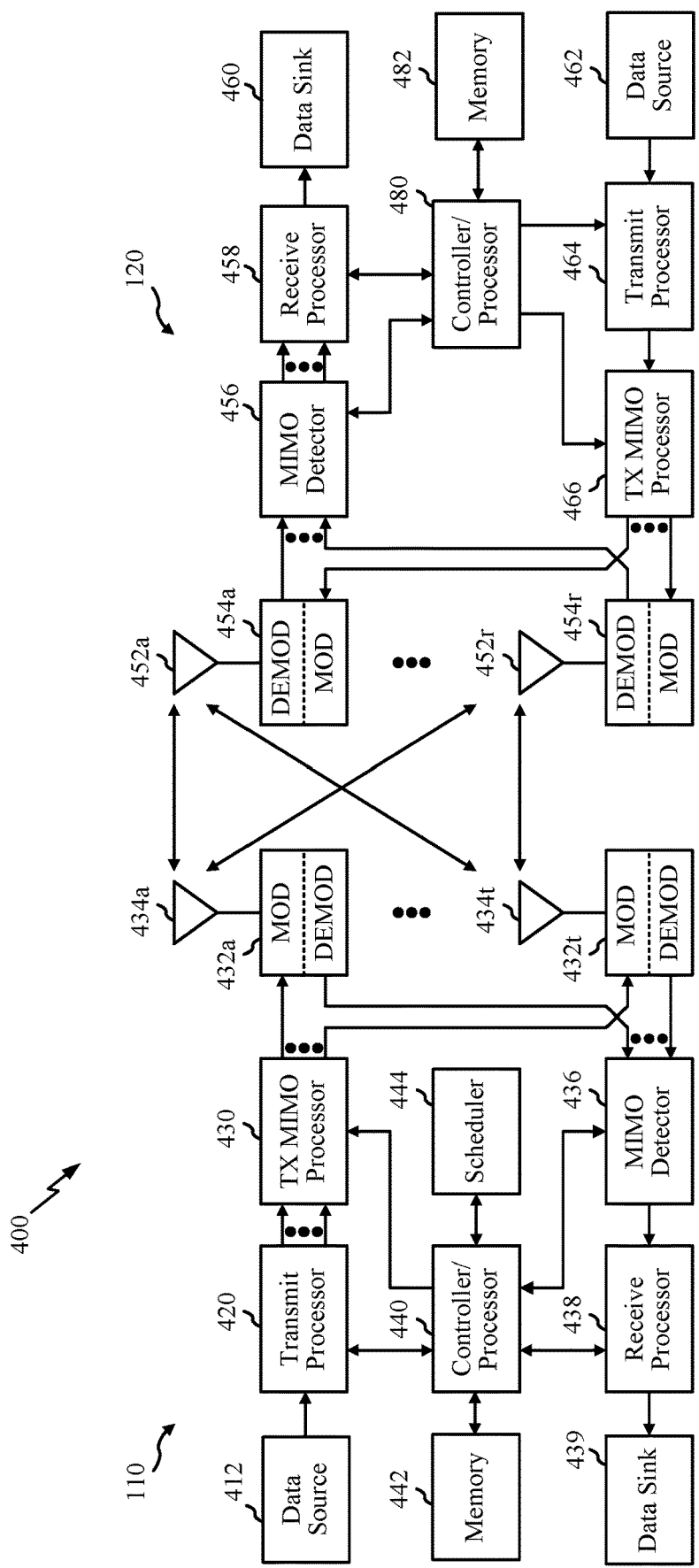
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 700 of FIG. 7. Similarly, antennas 434, processors 420, 430, 438, and/or controller/processor 440 of the BS 110 may perform (or be used to perform) operations 800 of FIG. 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
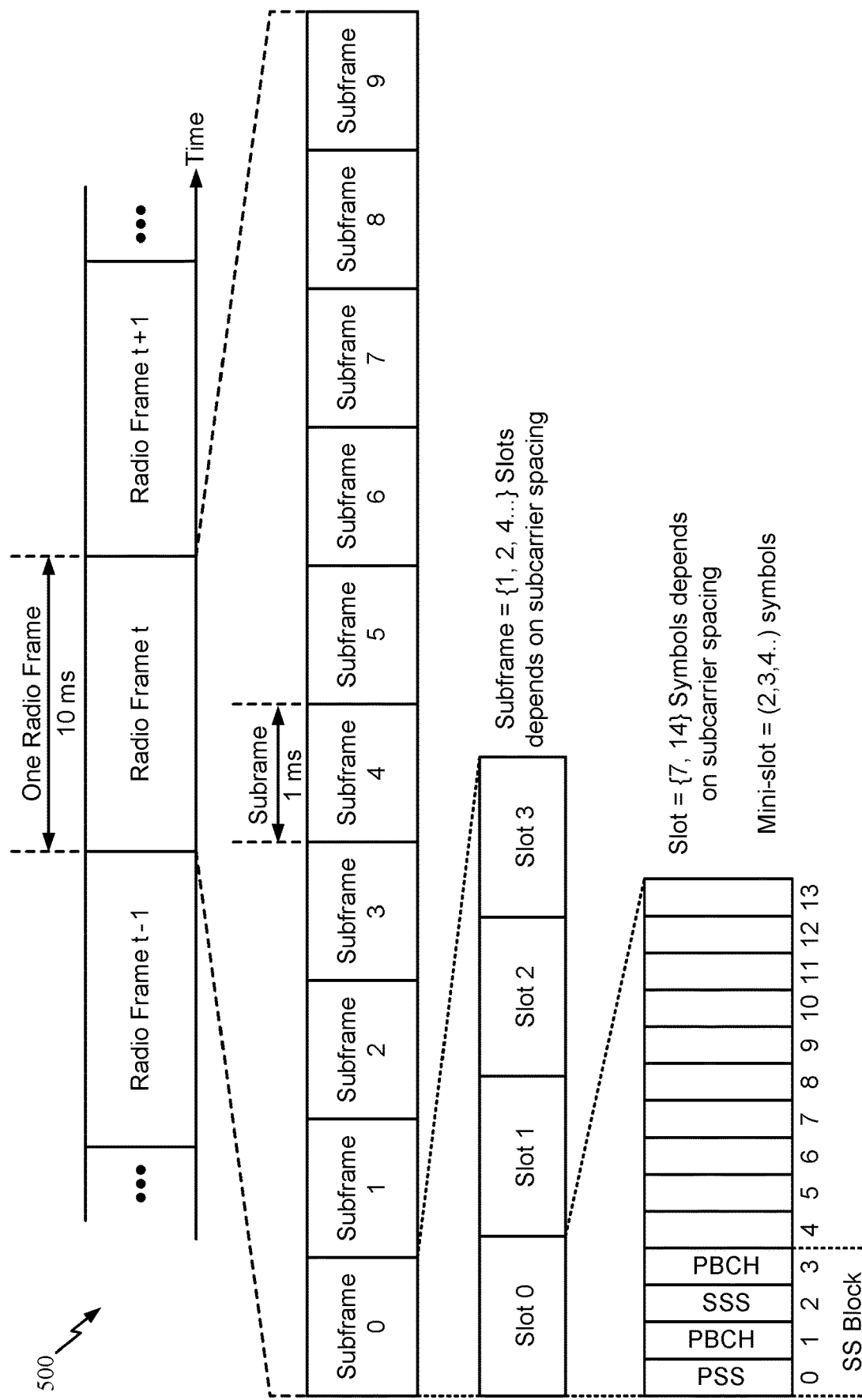
FIG. 5 is a diagram showing examples for implementing a communication protocol stack, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-TRP Scenarios

Figure 6:
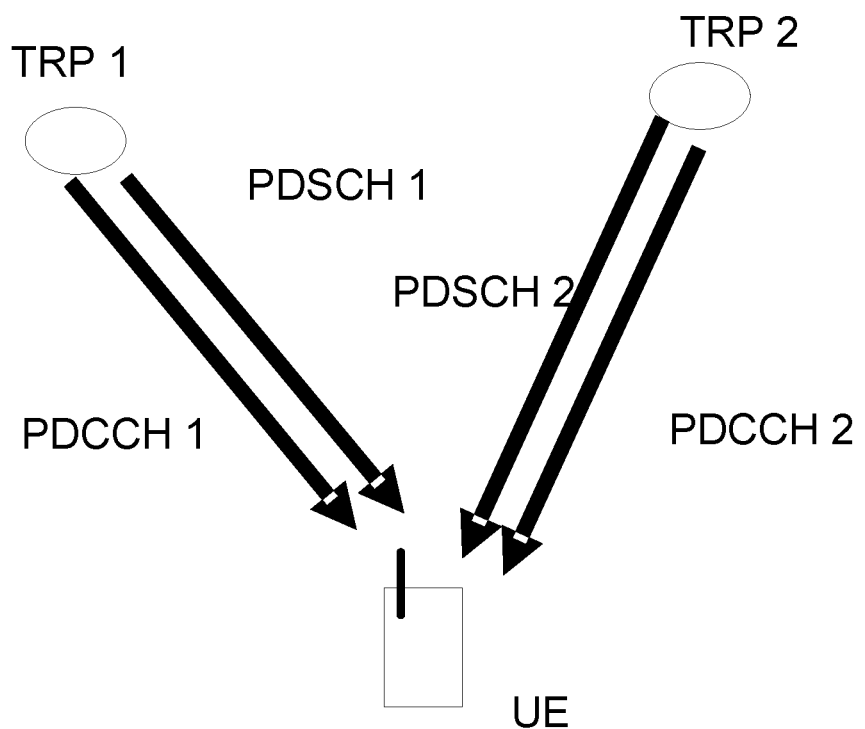
FIG. 6 illustrates a diagram illustrating an example multiple transmission reception point (TRP) transmission scenario, in accordance with certain aspects of the present disclosure.

NR networks are expected to utilize multiple transmission and reception points (TRPs) to improve reliability and capacity performance through flexible deployment scenarios. For example, allowing UEs to access wireless networks via multi-TRPs may help support increased mobile data traffic and enhance the coverage. Multi-TRPs may be used to implement one or more macro-cells, small cells, pico-cells, or femto-cells, and may include remote radio heads, relay nodes, and the like. FIG. 6 illustrates an example multi-TRP scenario, in which two TRPs (TRP 1 and TRP 2) serve a UE.

As illustrated in FIG. 6, for multi-TRP transmission, multiple PDCCHs (each transmitted from a different one of the multiple TRPs) may be used for scheduling. Each PDCCH may include corresponding downlink control information (DCI).

For example, PDCCH1 (transmitted from TRP 1) may carry a first DCI that schedules a first codeword (CW1) to be transmitted from TRP1 in PDSCH1. Similarly, PDCCH2 (transmitted from TRP2) may carry a second DCI that schedules a second codeword (CW2) to be transmitted from TRP2 in PDSCH2.

For monitoring the DCIs transmitted from different TRPs, a number of different control resource sets (CORESETs) may be used. As used herein, the term CORESET generally refers to a set of physical resources (e.g., a specific area on the NR Downlink Resource Grid) and a set of parameters that is used to carry PDCCH/DCI. For example, a CORESET may by similar in area to an LTE PDCCH area (e.g., the first 1, 2, 3, 4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. There may be other ways in which the notion of different TRPs may be transparent to the UE.

Example CSI Reference Resource for TDM Based mTRP Transmission

Aspects of the present disclosure relate to wireless communications, and more particularly, to techniques for calculating and reporting channel state information (CSI) for time division multiplexed (TDM) based multiple transmission reception point (mTRP) transmissions.

There are various mTRP based transmission schemes currently supported (e.g., in Rel-16). For example, non-coherent joint-transmission (NCJT) also referred to as a spatial division multiplexed (SDM) scheme may be applied to both URLLC and non-URLLC transmissions. In this case, a first set of layers is transmitted from a first TRP (TRP1), while a second set of layers is transmitted from a second TRP (TRP2).

For multi-DCI based NCJT, a first code word (CW1) is mapped to the first set of layers, while a second code word (CW2) is mapped to a second set of layers. For single-DCI based NCJT, a single CW is mapped to both the first and second sets of layers. The same resources are allocated to TRP1 and TRP2. The rank-pair applied to TRP1 and TRP2 are 1+1, 1+2, 2+1 and 2+2.

A frequency division multiplexed (FDM) mTRP scheme may be applied to URLLC. In this case, a same rank applies to transmission from TRP1 and TRP2. Different frequency resources may be allocated for each TRP. For example, for a wideband (WB) precoding resource block group (PRG), a first half total of the frequency domain resource allocation (FDRA) resources may be allocated to TRP1, while the second half may be allocated to TRP2. For subband PRGs (e.g., spanning 2 or 4 PRBs), even PRG(s) may be allocated to TRP1 and odd PRG(s) may be allocated to TRP2.

For the FDM scheme, different CW-to-layer mapping schemes may be used. According to a first scheme (Scheme 2a), a transport block size (TBS) may be determined using full resources of TRP1 and TRP2, with a same redundancy version (RV) mapped across full resources and layers of TRP1 and TRP2. According to a second scheme (Scheme 2b), TBS may be determined using a resource allocation (RA) of each TRP, with a same or different RV mapped to the RA and layers of TRP1 and TRP2.

A time division multiplexed (TDM) mTRP scheme may also be applied to URLLC. In this case, a same rank may be applied to transmission from TRP1 and TRP2. A same FDRA with different time division resource allocations (TDRAs), in terms of mini-slots may be applied, with each mini-slot (Tx occasion) corresponding to one TRP. For the TDM scheme, a single CW may be mapped to each Tx occasion with a specific RV.

Conventionally, CQI for mTRP may be calculated as follows. A UE may calculate CSI based on a CSI reference resource. For periodic/semi-persistent CSI reporting, the CSI reference resource may be a downlink slot (e.g., which is 4 or 5 ms prior to the UL slot carrying CSI report). For aperiodic CSI reporting, the CSI reference resource may be a downlink slot [Z'/14] prior to the UL slot carrying the CSI report, where Z' represents the CSI preparation timing.

The UE may assume the following when calculating CSI in the reference CSI resource. For example, the UE may assume that the first 2 symbols are dedicated for control signaling, that PDSCH and DMRS occupy 12 symbols, the BW configured for the CSI report (in the CSI report configuration), with RV=0, and no resource allocated for CSI-RS and PBCH.

For CQI calculation, the UE may assume a CW-to-layer mapping as first across the spatial domain (layer), second across the frequency domain, then (third) across the time domain. A single CQI is calculated for rank less than or equal to 4, while two CQIs are calculated for Rank greater than 4.

Using these assumptions, the UE may then derive the highest CQI index satisfying the following condition:

A single PDSCH transport block with a combination of modulation scheme, target code rate and transport block size corresponding to the CQI index, and occupying a group of downlink physical resource blocks termed the CSI reference resource could be received with BLER<=0.1 or 0.00001.

There are potential issues with the current CQI calculation assumptions. For example, in current techniques, CQI is calculated using the CSI reference resource which is a downlink slot with a certain assumption of overhead in terms of other channels. But this approach does not reflect the actual time domain resource allocation (TDRA) of the two TRPs with a TDM scheme.

Aspects of the present disclosure, however, may help address these potential issues by matching CQI calculation assumptions to the TDM schemes, for example, in which the same code word is repeated across mini-slots with an indicated TRP order and different RVs. As will be described in greater detail below, the repetition may be within the same slot (referred to as Scheme 3) or across slots (referred to as Scheme 4). Schemes 3 and 4 may be used in URLLC mTRP schemes.

Figure 7:
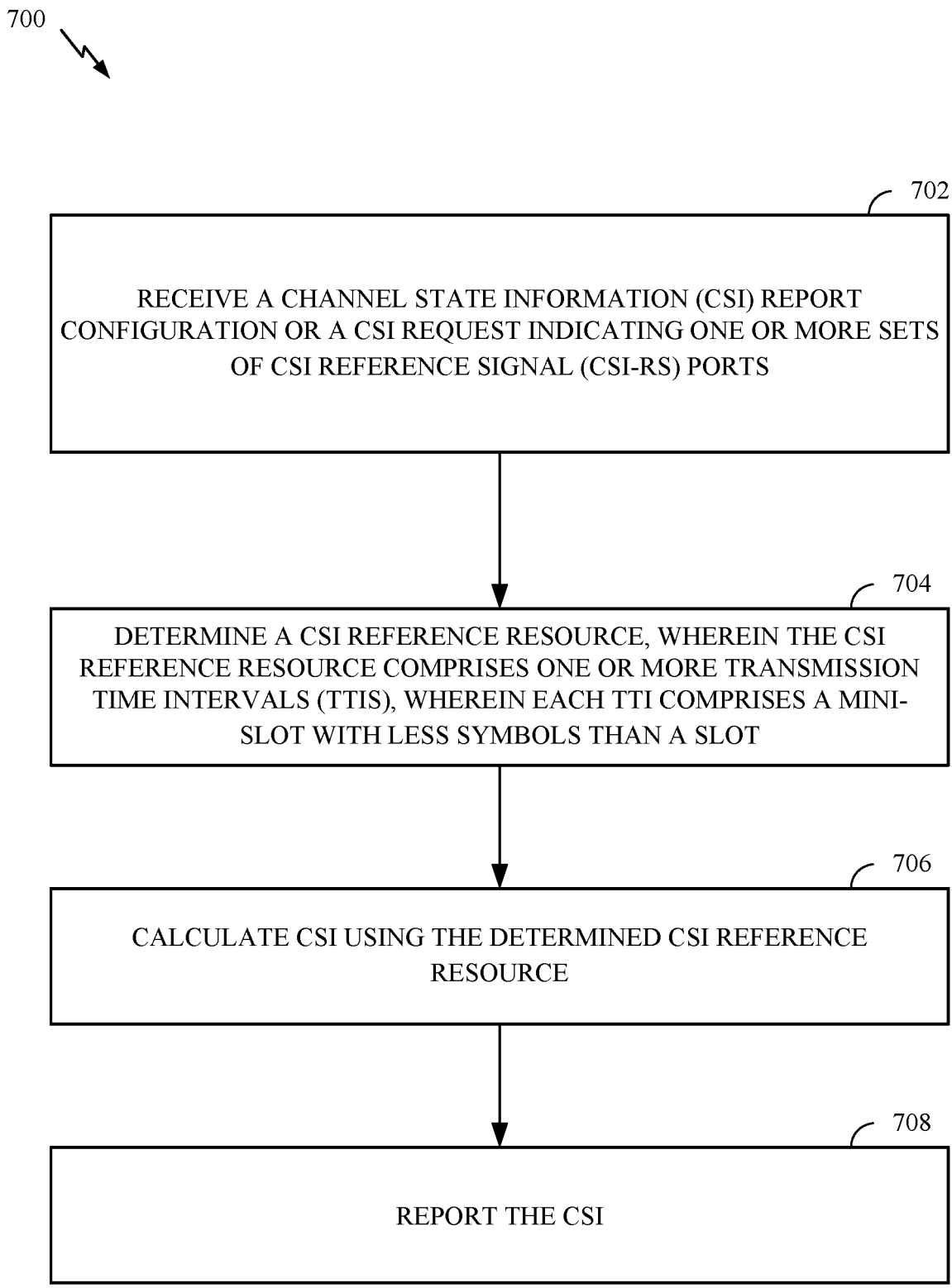
FIG. 7 illustrates example operations that may be performed by a UE, in accordance with certain aspects of the present disclosure.

FIG. 7 is a flow diagram illustrating example operations 8700 for wireless communications, in accordance with certain aspects of the present disclosure. The operations 700 may be performed, for example, by a UE (e.g., such as a UE 120 in the wireless communication network 100) to calculate and report CSI for TDM based mTRP transmissions.

Operations 700 begin, at 702, by receiving a channel state information (CSI) report configuration or a CSI request indicating one or more sets of CSI reference signal (CSI-RS) ports. At 704, the UE determines a CSI reference resource, wherein the CSI reference resource comprises one or more transmission time intervals (TTIs), wherein each TTI comprises a mini-slot wherein a mini-slot may comprise several symbols (e.g., 2, 4, 7, less than 14). At 706, the UE calculates CSI using the determined CSI reference resource. At 708, the UE reports the CSI.

Figure 8:
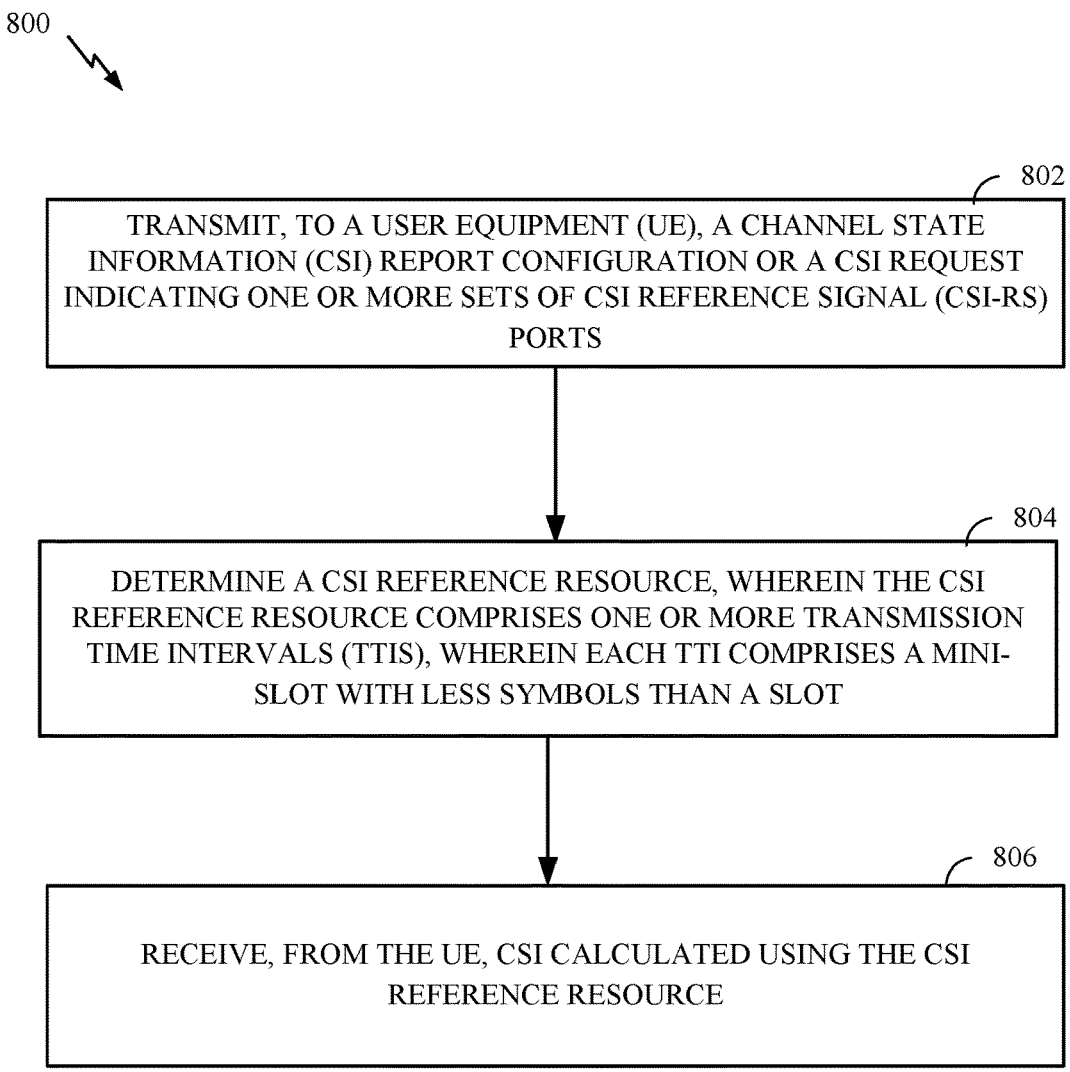
FIG. 8 illustrates example operations that may be performed by a network entity, in accordance with certain aspects of the present disclosure.

FIG. 8 is a flow diagram illustrating example operations 800 for wireless communications, in accordance with certain aspects of the present disclosure. The operations 800 may be performed, for example, by a network entity (e.g., such as a BS 110 in the wireless communication network 100) or TRP(s) to process CSI received from a UE performing operations 700 of FIG. 7.

Operations 800 begin, at 802, by transmitting, to a user equipment (UE), a channel state information (CSI) report configuration or a CSI request indicating one or more sets of CSI reference signal (CSI-RS) ports. At 804, the network entity determines a CSI reference resource, wherein the CSI reference resource comprises one or more transmission time intervals (TTIs), wherein each TTI comprises a mini-slot wherein a mini-slot may comprise several symbols (e.g., 2, 4, 7, less than 14). At 806, the network entity receives, from the UE, CSI calculated using the CSI reference resource.

To address the potential issue with CQI calculation assumption for TDM based mTRP assumptions, aspects of the present disclosure may define a CSI reference resource with respect to multiple mini slots (that occur Z' prior to the CSI report).

Figures 9A, 9B, 9C:
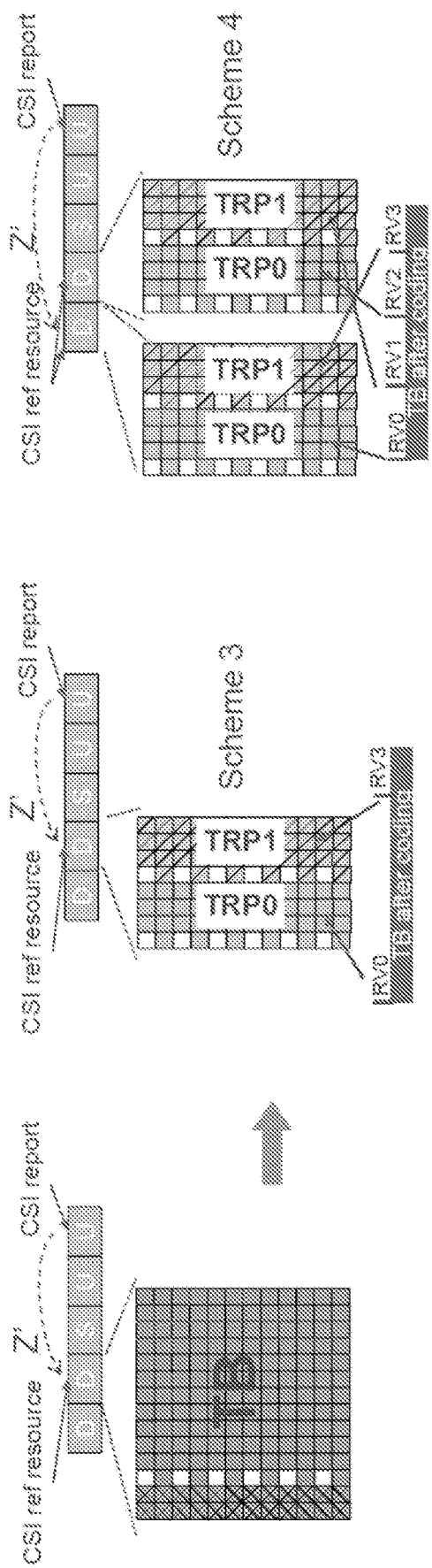
FIGS. 9A, 9B, and 9C illustrate example CSI reference resources, in accordance with certain aspects of the present disclosure.

When compared to the conventional CSI reference resource illustrated in FIG. 9A, aspects of the present disclosure effectively redefine the CSI reference resource as one or more mini-slots, as shown in FIGS. 9B and 9C. As illustrated in FIG. 9B, for scheme 3, the mini-slots are within one slot. As illustrated in FIG. 9C, for scheme 4, the mini-slots may span more than 1 slot.

Each mini slot may be assumed to have the same FDRA, control, and reference signal (RS) overhead. TRP order and number of mini-slots may be configured by the network.

In some cases, the UE may calculate CQI assuming a TB is applied to the mini-slot assigned to each TRP following a configured order and a specific RV order. In some example, the TRP order and the RV order is fixed in the specification. In the example shown in FIG. 9C, the configured TRP and RV order is:

(TRP0 RV0)→(TRP1,RV3)→(TRP0,RV2)→(TRP1, RV1).

In some cases, the network may indicate the TDRAs for the first and second TRPs. For example, the gNB may indicate, to the UE, whether the 1st half of TTIs are for TRP1 or TRP2, or whether the even TTIs are for TRP1 or TRP2. In other cases, the UE may indicate the TDRAs to the gNB. For example, the UE may indicate (e.g., in the CSI report) whether the 1st half of TTIs are for TRP1 or TRP2, or whether the even TTIs are for TRP1 or TRP2.

The UE procedure for determining CSI may be described as follows. For subband-based or wideband-based (SB/WB) CQI, in each SB/WB, the UE may determine the CSI reference resource. The UE may determine the number of mini-slots and TRP orders based on the configuration. The UE may then find a highest CQI corresponding to a single TB using the RA of each mini slot, such that the TB satisfies a target BLER by repeatedly mapping to mini-slot of each TRP with same/different RV using the PMI of the associated TRP. The UE may then report the CQI corresponding to this TB.

The UE may calculate the highest CQI satisfy the following conditions: a single PDSCH TB with a combination of modulation scheme, target coding rate and TBS corresponding to the CQI index, and occupying the RA of each mini slots in the CSI reference resource could be received with BLER<=0.1 or 0.00001. The UE may assume the TB would be mapped to each mini-slot repeatedly with same or different RV following an order of TRPs (e.g., as shown in the examples of FIGS. 9B and 9C).

EXAMPLE EMBODIMENTS

Embodiment 1: A method for wireless communications by a user equipment (UE), comprising receiving a channel state information (CSI) report configuration or a CSI request indicating one or more sets of CSI reference signal (CSI-RS) ports; determining a CSI reference resource, wherein the CSI reference resource comprises one or more transmission time intervals (TTIs), wherein each TTI comprises a mini-slot with less symbols than a slot; calculating CSI using the determined CSI reference resource; and reporting the CSI.

Embodiment 2: The method of Embodiment 1, wherein the one or more sets of CSI-RS ports comprise at least a first set of CSI-RS ports and a second set of CSI-RS ports; calculating the CSI comprises determining at least one assumption for calculating a channel quality indicator (CQI) based, at least in part, on a time domain resource allocation (TDRA) for transmissions to the UE, via a time division multiplexing (TDM) scheme, using at least a first set of channel state information reference signal (CSI-RS) ports and a second set of CSI-RS ports and calculating the CSI based on the at least one assumption; and the calculated CSI is reported in a CSI report.

Embodiment 3: The method of Embodiment 2, wherein: the first set of CSI-RS ports comprises at least one of a first port group or a first CSI-RS resource; and the second set of CSI-RS ports comprises at least one of a second port group or a second CSI-RS resource.

Embodiment 4: The method of any of Embodiments 1-2, further comprising: determining, among the one or more TTIs, a first set of TTIs as a first TDRA of the first set of CSI-RS ports and a second set of TTIs as a second TDRA of a second set of CSI-RS; wherein the CQI is calculated based on the first TDRA of the first set of CSI-RS ports and the second TDRA of the second set of CSI-RS ports.

Embodiment 5: The method of Embodiment 4, further comprising: determining the first set of TTIs comprises a first half the total number of TTIs and the second set of TTIs comprises the second half of the total number of TTIs; or determining the first set of TTIs comprises a second half the total number of TTIs and the second set of TTIs comprises the first half of the total number of TTIs.

Embodiment 6: The method of any of Embodiments 1-5, further comprising: determining the first set of TTIs comprises the even number TTIs of the total number of TTIs and the second set of TTIs comprises the odd number TTIs of the total number of TTIs; or determining the first set of TTIs comprises the odd number TTIs of the total number of TTIs and the second set of TTIs comprises the even number TTIs of the total number of TTIs.

Embodiment 7: The method of any of Embodiments 1-6, further comprising receiving a configuration of the $1^{st}$ TDRA and $2^{nd}$ TDRA; and determining the $1^{st}$ and $2^{nd}$ TDRA based on the configuration.

Embodiment 8: The method of any of Embodiments 1-7, further comprising reporting the $1^{st}$ and $2^{nd}$ TDRA in the CSI report.

Embodiment 9: The method of any of Embodiments 1-8, further comprising receiving a configuration indicating the number of TTIs.

Embodiment 10: The method of any of Embodiments 1-9, wherein the CSI is also calculated based on an assumption that each slot has a same frequency division resource allocation (FDRA), control and reference signal (RS) overhead.

Embodiment 11: The method of any of Embodiments 1-10, wherein the determination is based, at least in part, on a codeword-to-layer mapping of a TDM scheme in which a same codeword is repeated across mini-slots according to the TDRA of the one or more set of CSI-RS ports.

Embodiment 12: The method of Embodiment 11, wherein: for a first TDM scheme, the mini-slots are within one slot; and for a second TDM scheme, the mini-slots span multiple slots.

Embodiment 13: The method of any of Embodiments 1-12, wherein the UE: determines the CSI reference resource, the number of mini-slots, and the CSI-RS port order; and finds a highest CQI corresponding to a single transport block using a resource allocation of each mini slot, wherein the TB satisfies a condition related to a performance metric by repeatedly mapping the TB to mini-slots of each set of CSI-RS ports using a precoding matrix indicator (PMI) associated to the set of CSI-RS ports.

Embodiment 14: The method of Embodiment 13, further comprises determines the CSI reference resource, the number of mini-slots, and the CSI-RS port order based on the configuration.

Embodiment 15: The method of any of Embodiments 1-13, wherein the TB is repeatedly mapped to the mini-slots with different redundancy versions (RVs) according to an RV order.

Embodiment 16: A method for wireless communications by a network entity, comprising: transmitting, to a user equipment (UE), a channel state information (CSI) report configuration or a CSI request indicating one or more sets of CSI reference signal (CSI-RS) ports; determining a CSI reference resource, wherein the CSI reference resource comprises one or more transmission time intervals (TTIs), wherein each TTI comprises a mini-slot with less symbols than a slot; and receiving, from the UE, CSI calculated using the CSI reference resource.

Embodiment 17: The method of Embodiment 16, wherein: the one or more sets of CSI-RS ports comprise at least a first set of CSI-RS ports and a second set of CSI-RS ports; the UE calculates the CSI comprises determining at least one assumption for calculating a channel quality indicator (CQI) based, at least in part, on a time domain resource allocation (TDRA) for transmissions to the UE, via a time division multiplexing (TDM) scheme, using at least a first set of channel state information reference signal (CSI-RS) ports and a second set of CSI-RS ports and calculating the CSI based on the at least one assumption; and the calculated CSI is reported in a CSI report.

Embodiment 18: The method of Embodiment 17, wherein: the first set of CSI-RS ports comprises at least one of a first port group or a first CSI-RS resource; and the second set of CSI-RS ports comprises at least one of a second port group or a second CSI-RS resource.

Embodiment 19: The method of any of Embodiments 16-17, further comprising: determining, among the one or more TTIs, a first set of TTIs as a first TDRA of the first set of CSI-RS ports and a second set of TTIs as a second TDRA of a second set of CSI-RS; wherein the CQI is calculated based on the first TDRA of the first set of CSI-RS ports and the second TDRA of the second set of CSI-RS ports.

Embodiment 20: The method of Embodiment 19, further comprising:
 determining the first set of TTIs comprises a first half the total number of TTIs and the second set of TTIs comprises the second half of the total number of TTIs; or determining the first set of TTIs comprises a second half the total number of TTIs and the second set of TTIs comprises the first half of the total number of TTIs.

Embodiment 21: The method of any of Embodiments 16-19, further comprising: determining the first set of TTIs comprises the even number TTIs of the total number of TTIs and the second set of TTIs comprises the odd number TTIs of the total number of TTIs; or determining the first set of TTIs comprises the odd number TTIs of the total number of TTIs and the second set of TTIs comprises the even number TTIs of the total number of TTIs.

Embodiment 22: The method of any of Embodiments 16-19, further comprising sending the UE a configuration of the $1^{st}$ TDRA and $2^{nd}$ TDRA; and determining the $1^{st}$ and $2^{nd}$ TDRA based on the configuration.

Embodiment 23: The method of any of Embodiments 16-19, further comprising receiving, from the UE, a reporting of the $1^{st}$ and $2^{nd}$ TDRA in the CSI report.

Embodiment 24: The method of any of Embodiments 16-23, further comprising sending the UE a configuration indicating the number of TTIs.

Embodiment 25: The method of any of Embodiments 16-24, wherein the CSI is also calculated based on an assumption that each slot has a same frequency division resource allocation (FDRA), control and reference signal (RS) overhead.

Embodiment 26: The method of any of Embodiments 16-25, wherein the determination is based, at least in part, on a codeword-to-layer mapping of a TDM scheme in which a same codeword is repeated across mini-slots according to the TDRA of the one or more set of CSI-RS ports.

Embodiment 27: The method of Embodiment 26, wherein: for a first TDM scheme, the mini-slots are within one slot; and for a second TDM scheme, the mini-slots span multiple slots.

Embodiment 28: The method of any of Embodiments 16-27, wherein: determining the CSI reference resource, the number of mini-slots, and the CSI-RS port order; and the CQI is calculated as a highest CQI corresponding to a single transport block using a resource allocation of each mini slot, wherein the TB satisfies a condition related to a performance metric by repeatedly mapping the TB to mini-slots of each set of CSI-RS ports using a precoding matrix indicator (PMI) associated to the set of CSI-RS ports.

Embodiment 29: The method of Embodiment 28, further comprising transmitting a configuration of at least one of the CSI reference resource, the number of mini-slots, and the CSI-RS port order to the UE.

Embodiment 30: The method of any of Embodiments 16-28, wherein the TB is repeatedly mapped to the mini-slots with different redundancy versions (RVs) according to an RV order.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
determining a channel state information (CSI) reference resource, wherein the CSI reference resource comprises one or more transmission time intervals (TTIs), wherein each TTI comprises a mini-slot with less symbols than a slot, wherein each mini-slot is assigned to a different transmission reception point (TRP) of a plurality of TRPs for coordinated multi-point transmission;
receiving a channel state information (CSI) report configuration or a CSI request indicating one or more sets of CSI reference signal (CSI-RS) ports, the one or more sets of CSI-RS ports comprise at least a first set of CSI-RS ports and a second set of CSI-RS ports;
calculating the CSI comprises determining at least one assumption for calculating a channel quality indicator (CQI) based, at least in part, on a time domain resource allocation (TDRA) for transmissions to the UE, via a time division multiplexing (TDM) scheme, using at least a first set of channel state information reference signal (CSI-RS) ports and a second set of CSI-RS ports and calculating the CSI based on the at least one assumption;
determining, among the one or more TTIs, a first set of TTIs as a first TDRA of the first set of CSI-RS ports and a second set of TTIs as a second TDRA of a second set of CSI-RS, wherein the CQI is calculated based on the first TDRA of the first set of CSI-RS ports and the second TDRA of the second set of CSI-RS ports;
calculating CSI using the determined CSI reference resource, the calculated CSI reported in a CSI report; and
reporting the CSI.

2. The method of claim 1, wherein:
the first set of CSI-RS ports comprises at least one of a first port group or a first CSI-RS resource; and
the second set of CSI-RS ports comprises at least one of a second port group or a second CSI-RS resource.

3. The method of claim 1, further comprising:
determining the first set of TTIs comprises a first half the total number of TTIs and the second set of TTIs comprises the second half of the total number of TTIs; or
determining the first set of TTIs comprises a second half the total number of TTIs and the second set of TTIs comprises the first half of the total number of TTIs.

4. The method of claim 1, further comprising:
determining the first set of TTIs comprises the even number TTIs of the total number of TTIs and the second set of TTIs comprises the odd number TTIs of the total number of TTIs; or
determining the first set of TTIs comprises the odd number TTIs of the total number of TTIs and the second set of TTIs comprises the even number TTIs of the total number of TTIs.

5. The method of claim 1, further comprising
receiving a configuration of the $1^{st}$ TDRA and $2^{nd}$ TDRA; and determining the $1^{st}$ and $2^{nd}$ TDRA based on the configuration.

6. The method of claim 1, further comprising reporting the $1^{st}$ and $2^{nd}$ TDRA in the CSI report.

7. The method of claim 1, further comprising receiving a configuration indicating the number of TTIs.

8. The method of claim 1, wherein the CSI is also calculated based on an assumption that each slot has a same frequency division resource allocation (FDRA), control and reference signal (RS) overhead.

9. The method of claim 1, wherein the determination is based, at least in part, on a codeword-to-layer mapping of a time division multiplexed (TDM) scheme in which a same codeword is repeated across mini-slots according to a time domain resource allocation (TDRA) of the one or more set of CSI-RS ports.

10. The method of claim 9, wherein:
for a first TDM scheme, the mini-slots are within one slot; and
for a second TDM scheme, the mini-slots span multiple slots.

11. The method of claim 9, wherein the UE:
determines the CSI reference resource, the number of mini-slots, and the CSI-RS port order; and
finds a highest channel quality indicator (CQI) corresponding to a single transport block using a resource allocation of each mini slot, wherein a transport block (TB) satisfies a condition related to a performance metric by repeatedly mapping the TB to mini-slots of each set of CSI-RS ports using a precoding matrix indicator (PMI) associated to the set of CSI-RS ports.

12. The method of claim 11, further comprises determines the CSI reference resource, the number of mini-slots, and the CSI-RS port order based on the configuration.

13. The method of claim 11, wherein the TB is repeatedly mapped to the mini-slots with different redundancy versions (RVs) according to an RV order.

14. A method for wireless communications by a network entity, comprising:
transmitting, to a user equipment (UE), a channel state information (CSI) report configuration or a CSI request indicating one or more sets of CSI reference signal (CSI-RS) ports, the one or more sets of CSI-RS ports comprise at least a first set of CSI-RS ports and a second set of CSI-RS ports;
determining a channel state information (CSI) reference resource, wherein the CSI reference resource comprises one or more transmission time intervals (TTIs), wherein each TTI comprises a mini-slot with less symbols than a slot, wherein each mini-slot is assigned to a different transmission reception point (TRP) of a plurality of TRPs for coordinated multi-point transmission, wherein the UE calculates the CSI comprises determining at least one assumption for calculating a channel quality indicator (CQI) based, at least in part, on a time domain resource allocation (TDRA) for transmissions to the UE, via a time division multiplexing (TDM) scheme, using at least a first set of channel state information reference signal (CSI-RS) ports and a second set of CSI-RS ports and calculating the CSI based on the at least one assumption;
determining, among the one or more TTIs, a first set of TTIs as a first TDRA of the first set of CSI-RS ports and a second set of TTIs as a second TDRA of a second set of CSI-RS, wherein the COI is calculated based on the first TDRA of the first set of CSI-RS ports and the second TDRA of the second set of CSI-RS ports; and
receiving, from the UE, CSI calculated using the CSI reference resource, wherein the calculated CSI is reported in a CSI report.

15. The method of claim 14, wherein:
the first set of CSI-RS ports comprises at least one of a first port group or a first CSI-RS resource; and
the second set of CSI-RS ports comprises at least one of a second port group or a second CSI-RS resource.

16. The method of claim 14, further comprising:
determining the first set of TTIs comprises a first half the total number of TTIs and the second set of TTIs comprises the second half of the total number of TTIs; or
determining the first set of TTIs comprises a second half the total number of TTIs and the second set of TTIs comprises the first half of the total number of TTIs.

17. The method of claim 14, further comprising:
determining the first set of TTIs comprises the even number TTIs of the total number of TTIs and the second set of TTIs comprises the odd number TTIs of the total number of TTIs; or
determining the first set of TTIs comprises the odd number TTIs of the total number of TTIs and the second set of TTIs comprises the even number TTIs of the total number of TTIs.

18. The method of claim 14, further comprising sending the UE a configuration of the $1^{st}$ TDRA and $2^{nd}$ TDRA; and determining the $1^{st}$ and $2^{nd}$ TDRA based on the configuration.

19. The method of claim 14, further comprising receiving, from the UE, a reporting of the $1^{st}$ and $2^{nd}$ TDRA in the CSI report.

20. The method of claim 14, further comprising sending the UE a configuration indicating the number of TTIs.

21. The method of claim 14, wherein the CSI is also calculated based on an assumption that each slot has a same frequency division resource allocation (FDRA), control and reference signal (RS) overhead.

22. The method of claim 14, wherein the determination is based, at least in part, on a codeword-to-layer mapping of a time division multiplexed (TDM) scheme in which a same codeword is repeated across mini-slots according to a time domain resource allocation (TDRA) of the one or more set of CSI-RS ports.

23. The method of claim 22, wherein:
for a first TDM scheme, the mini-slots are within one slot; and
for a second TDM scheme, the mini-slots span multiple slots.

24. The method of claim 22, wherein:
determining the CSI reference resource, the number of mini-slots, and the CSI-RS port order; and
a channel quality indicator (CQI) is calculated as a highest CQI corresponding to a single transport block (TB) using a resource allocation of each mini slot, wherein the TB satisfies a condition related to a performance metric by repeatedly mapping the TB to mini-slots of each set of CSI-RS ports using a precoding matrix indicator (PMI) associated to the set of CSI-RS ports.

25. The method of claim 24, further comprising transmitting a configuration of at least one of the CSI reference resource, the number of mini-slots, and the CSI-RS port order to the UE.

26. The method of claim 24, wherein the TB is repeatedly mapped to the mini-slots with different redundancy versions (RVs) according to an RV order.

* * * * *